3,627,563
Patented Dec. 14, 1971

3,627,563
FLEXIBLE TRANSLUCENT COATING FILMS FOR DRAFTING PURPOSES
Romain Henri Bollen, Hove, and Willy Karel van Landeghem, Sint-Gillis-Waas, Belgium, assignors to Gevaert-Agfa N.V., Mortsel, Belgium
No Drawing. Filed Mar. 28, 1969, Ser. No. 813,401
Claims priority, application Great Britain, Feb. 11, 1967, 7,391/69
Int. Cl. B44d 5/02, 5/04
U.S. Cl. 117—62          21 Claims

ABSTRACT OF THE DISCLOSURE

A dimensionally stable drafting film which has good pencil and ink receptivity and is easily erasable without leaving erasure marks comprising (1) a dimensionally stable polyester film substrate and (2) a mat layer containing pigment particles uniformly coated over said support is described. The mat layer consists essentially of the moiety of a binder combination including a soluble, partially cured formaldehyde resin; a diisocyanate modified polyester or polyesteramide, finely divided hard pigment particles, and a hydrophilic component. The moiety is formed by heating an admixture of said binder combination in the presence of an acid cross-linking catalyst for the formaldehyde resin and diisocyanate modified polyester or polyesteramide at an elevated temperature for a time sufficient to polymerize the resin combination. The mat layer is to have a thickness substantially equal to the average diameter of the pigment particles with the particles being present in the layer in an amount sufficient to constitute from about 30 to 50 percent by weight of the total weight of the dried mat layer.

---

The invention relates to flexible translucent coated films for drafting purposes, more particularly to polyester films having an improved surface for use with a wide variety of drafting pens and pencils.

Mat polyester films, suitable for writing on with ink or pencil, are used as drafting films in cases where the properties of tracing paper e.g. the capability of being retouched, the mechanical strength, the dimensional stability and the flatness are unsatisfactory. In general a foil, capable of being written on, is composed of a support e.g. a cellulose ester support or a polyester support, and a mat layer comprising hard colourless pigment particles and a binding agent. The adhesion between support and mat layer may be improved by means of a subbing layer. The rear side of the support may also be provided with a pigmented or a non-pigmented layer.

The principal demands made on a layer, capable of being written on easily, are the following:

(1) The layer should have a good pencil receptivity, even with pencils having a relatively high hardness and it should accept the ink very well, i.e. without running or contraction of the ink lines.
(2) The pencil and ink marks should be easily erasable so that so-called ghost images do not remain, particularly in the case of ink.
(3) The layer should easily accept pencil or ink marks after erasure.
(4) The layer should not be damaged mechanically (scratches) by the drawing instruments.
(5) There should be an adequate adhesion between the support and the mat layer.
(6) The layer, capable of being written on, should have a sufficient opacity.
(7) The layer should be dimensionally stable. The shrinkage of the layer should be as low as possible.
(8) The support should not tend to curl or bend.

There has now been found a process for the manufacture of a drafting film that satisfies all these requirements, this process comprising applying to a polyester film support a layer from a dispersion of finely divided hard pigment particles in a solution of a binder combination of a soluble partially cured formaldehyde resin and a diisocyanate-modified polyester or polyesteramide, adding to this solution a hydrophilic component and an acid cross-linking catalyst for said formaldehyde resin and said diisocyanate-modified polyester or polyesteramide and heating the layer at the cross-linking temperature, the thickness of said layer being equal to the average diameter of said pigment particles and the concentration of said pigment particles in said layer ranging from 30 to 50% by weight of the total weight of the dried layer.

In the coating technique the expression "critical pigment volume concentration" is used, which represents the condition of tightest possible packing of the pigment particles, compatible with the presence of the minimum amount of binder needed to provide the adsorption layer on the pigment particles and to fill the interstices between the wetted particles. If in a particular case, the amount of binder is insufficient to fill the interstices, then the film will show an increased permeability, in particular to water (see Modern Surface Coatings, by P. Nylen and E. Sunderland, Interscience Publishers, 1965, New York, page 386).

Pigments that can be used in the drafting layers according to the invention are silicon dioxide e.g. in the form of kieselguhr or quartz powder, aluminium oxide, titanium dioxide, silicon carbide, magnesium carbide, and glass powder (ground glass). Preferably, quartz powder or crystalline silicon dioxide having a particle size preferably beneath approximately 10 microns is used. The optimum size appears to be approximately 5 microns.

The polyesters and polyesteramides both modified with diisocyanates, which are used in the combination of binding agents for the pigment particles, are high molecular weight polycondensation products comprising amine and/or amide groups, and/or urethane groups, and/or substituted urea groups that are reactive with formaldehyde. Examples of such polycondensates are the polyesters and polyesteramides both modified with organic diisocyanates such as described i.a. in the United Kingdom patent specification 580,524. These are elastomers, which under the influence of an acid catalyst, can be cross-linked easily with formaldehyde. The polyesteramides are cured by reaction of formaldehyde with the active hydrogen atoms of the amide groups, whereas the polyesters containing free hydroxyl groups are cured by reaction of formaldehyde with the active hydrogen atoms of the free hydroxyl groups.

The formaldehyde needed to cross-link the above-mentioned elastomers under the influence of an acid catalyst, is procured by the soluble partially cured formaldehyde resins, which constitute the second component in the binder combination. Phenol formaldehyde resins, urea formaldehyde resins, and melamine formaldehyde resins are useful in soluble, partially cured form. More particulars on this subject can be found in the United Kingdom patent specification 580,524.

In practice, strong acids such as hydrochloric acid, phosphoric acid, sulphonic acids such as polystyrene sulphonic acid, p-toluene sulphonic acid and dodecylbenzene sulphonic acid are used mainly as catalysts for the curing reaction under the influence of heat with the formaldehyde resins. Yet, other substances, which actually react as an acid, e.g. substances forming or splitting off an acid, can also be employed. Examples of such substances are primary or secondary phosphates and sulphonates, more particularly p-toluene sulphonyl chloride, dibenzyl sulphate, morpholine p-toluene sulphonic acid, monobutyl phosphate, and dibutyl phosphate.

Optimal results are obtained when the proportion between the polyester or polyesteramide both modified with diisocyanates and the partially cured formaldehyde resin ranges between 20:80 and 60:40% by weight. Indeed; if the amount of modified polyester or polyesteramide exceeds 60% by weight, the binder composition in combination with the pigment particles is too soft to serve as binding agent for the layer capable of being written on. If the amount of modified polyester or polyesteramide is lower than 20% by weight, the layer becomes too brittle. In some cases the polyesters and polyesteramides both modified with diisocyanates and the partially cured formaldehyde resins can be replaced in part by polymers containing reactive hydrogen atoms, e.g. polyvinyl formal or polyvinyl butyral, and in general polymers containing vinyl alcohol groups, e.g. copolymers of vinyl chloride, vinyl alcohol, and vinyl acetate.

The curing reaction under the influence of the acid catalyst is accelerated by heating the coated layer to a temperature of 80–120° C.

As mentioned before the material should be capable of being written on easily with pencil. This property is connected with the abrasion of the pencil lead by the pigment particles, which consequently should possess a sufficient hardness. Crystalline silica satisfies this requirement; amorphous silica to a much smaller extent. Moreover, the pigment particles should protrude from the surface of the layer. There has been found that this can be accomplished by selecting the thickness of the layer during coating in such a way, that it is of the same magnitude as the average diameter of the pigment particles used. Preference is given to the use of crystalline silica particles having a thickness of approximately 5 micron. The coated layer should also have a thickness of approximately 5 microns. If silica particles having an average diameter larger or smaller than $5\mu$ are used, the thickness of the layer should, of course, be modified in the same sense. In this way a monolayer of pigment particles is formed. The concentration of the pigment particles should be almost equal to the critical pigment volume concentration, because a continuous acceptance of pencil lead is guaranteed in this manner.

According to the above-mentioned book of Nylen and Sunderland pp. 384–385, the pigment volume concentration of $$a \text{ layer} = \frac{\text{volume of the pigment} \times 100}{\text{volume of pigment} + \text{volume of binder}}$$

The volume of the pigment is the compact volume, not including pores and spaces between the particles. It is readily calculated from the mass and density of a given amount of pigment.

When the amount of binder, which is adsorbed on the pigment particles and prevents them from contacting one another, is not considered in the critical pigment volume concentration, and in the assumption that the pigment particles have a spherical shape there can easily be calculated, that the critical pigment volume concentration of a monolayer of pigment particles would approximate 60% of the total volume of the dry layer. Accordingly, in a monolayer of pigment particles the tightest possible packing of the pigment particles can theoretically reach a maximum value of 60% of the volume of the layer, if the thickness of the layer is equal to the diameter of the pigment particles. The capability of the layer of being written on is most regular in this case, because the tops of the pigment particles are at a minimum distance from one another. However, in order that the layer should have a maximum strength and capability of being retouched, the volume of the binder should amount to somewhat less than the remaining 40%, which results in the fact that between the tops of two neighbouring pigment particles the layer shows an extremely little tendency towards shrinkage.

In practice, however, the maximum value of 60% by volume of pigment particles in the layer can never be reached, because the pigment particles do not possess the ideal spherical shape and also because the amount of binding agent adsorbed at the surface of the pigment particles, inhibits a close packing of the latter.

In the case of a higher spreading of the particles, i.e. when the pigment volume concentration is lower than the critical pigment volume concentration, i.e. lower than 60% of the volume of the layer, the concentration of the binding agent should be increased to approximately the same extent for preserving the above-mentioned properties of strength and capability of being retouched. From out tests it appears that the best results are obtained, when the pigment volume concentration ranges from 25 to 55% of the critical pigment volume concentration. Considering the density of the pigments, this corresponds with a weight proportion of 30 to 50% of pigment calculated on the total weight of the dry layer.

If the pigment concentration in a layer, which is thicker than the average diameter of the pigment particles is less than 30 to 50% of the total weight of said layer, this layer cannot or almost not be written on with pencil. A so-called monolayer, having a same weight proportion of pigment and a thickness, which is as large as the average diameter of the pigment particles, can easily be written on. The capability of being written on becomes ideal, when the critical pigment volume concentration is approximated as close as possible.

The abrasion of the pencil-lead diminishes with the absolute surface roughness. In a monolayer, the pigment concentration of which approximates the critical pigment volume concentration, i.e. a pigment concentration of approximately 30 to 50% by weight calculated on the dry layer, the abrasion of the pencil-lead is also determined by the size of the pigment particles, so that small pigment particles are preferred, if a more reduced abrasion is desired.

Favourable results are attained with pigment particles having a diameter below 10 micron, preferably of approximately 5 micron. It follows, that the thickness of the monolayer should preferably also mount to approximately 5 micron. Yet, pigment particles having other thicknesses are not excluded, though the thickness of the layer need be adapted in that case. The ink-acceptance of the drafting layer is based on the absorption of ink by the pores of the lacquer layer or is based on the hydrophilic nature of the binding agent. Absorption in the pores implies that the pigment volume concentration is much lower than the critical pigment volume concentration, which is impossible according to the process of the present invention. After having been cured completely the binder combination has become hydrophobic, so that a hydrophilic component must be added to the coating composition of the layer. In general, favourable results are attained with phosphate compounds. Preference is given, however, to monoalkyl esters of phosphoric acid e.g. monobutyl phosphate. When determining the amount of hydrophilic component to be added, the adsorption thereof on the pigment surface should be taken into account. The adsorbed amount of e.g. monobutyl phosphate by crystalline silica having a particle size of 5 micron, is approximately 2.5% of the total amount. The amount added to the lacquer should normally vary between 1 and 5% by weight calculated on the total weight of the dry layer.

Instead of an addition of the hydrophilic component to the coating composition of the layer, the surface of the layer can also be treated with this hydrophilic component. In this case, however, the ink tends to run, which should be avoided by all means.

In order to improve the surface structure of the drafting layer, small amounts of so-called levelling agents e.g.

low molecular polysiloxane can be added also to the composition of the drafting layer.

The erasability of the pencil-lead depends on the roughness of the surface, i.e. on the depth and the stepness of the interstices between the pigment particles. In a monolayer the erasability is dependent on the particle size, so that once again preference is given to small pigment particles. Ink is erasable because it does not penetrate deeply into the lacquer layer. Otherwise, a ghost image would remain after erasure. Consequently, the lacquer layer should comprise few pores if any, which condition can be accomplished at the critical pigment volume concentration.

In order to guarantee a favourable acceptance of pencil and ink after erasure, the lacquer surface must not be flattened during erasure owing to tearing out of the pigment particles from the layer or pressing in of the pigment particles into this layer. If the critical pigment volume concentration is reached, at which concentration the whole pigment particle is bound by the binding agent, there is no danger for tearing out of the particles. In a monolayer, wherein the particles are sustained directly by the polyester support, the particles can only be pressed into the layer to an extremely low extent.

If the ink-acceptance is based on the absorption of the ink by the pores of the layer, then this acceptance could be decreased in consequence of the closing of these pores during erasure. In the materials according to the invention, however, the ink-acceptance is based on the hydrophilic nature of the layer in consequence of the presence of the hydrophilic component therein so that it is not influenced by erasure or retouching.

The abrasion resistance increases mainly with the strength of the binding agent and the concentration of the pigment. If necessary, a lubricant can be applied to the lacquer surface, to enhance the abrasion resistance even further. For instance an extremely thin layer, having a thickness of 0.1 micron, of a waxy fatty acid amide such as oleylamide can be applied to the surface.

The binder combination of formaldehyde resin and polyester or polyesteramide modified both with diisocyanates strongly adheres to the surface of the polyester support, so that it is unnecessary to provide a special subbing layer.

The opacity of a mat layer decreases with increasing pigment concentration. The thickness of the layer has but a weak influence thereon. At the critical pigment volume concentration the opacity of some pigments is insufficient, so that normally a white pigment e.g. titanium dioxide is added to the lacquer of the drafting film.

It is generally known that changes in relative humidity have no influence on the dimensional stability of polyester films. Subbing layers may decrease this dimensional stability somewhat. In this case the dimensional stability is particularly dependent on the hydrophilic nature of the binding agent and on the thickness of the subbing layer. The dimensional stability of the monolayers according to the invention is high because of the extremely low thickness of the layer. Moreover, the hydrophilicity of the binding agent decreases with increasing crosslinking.

The flatness of a film is determined by the difference of the tensions in the composite layers as well as by their relative thickness. In order to produce a completely flat drafting film, drafting lacquers with equal thicknesses can be applied to both sides of the support. This black-layer can also be replaced by a clear back-layer. In both cases the flatness of the whole material is determined exclusively by the flatness of the support.

The invention particularly describes a drafting film, wherein a polyester film acts as support for the drafting lacquer. It is obvious, that drafting lacquers as described in the present invention can also be applied to other supports e.g. paper supports, and in such case yield very good drafting surfaces too.

To further improve the drafting films of the invention the drafting surface may be exposed to a high voltage electric corona discharge. Indeed in some cases fingerprint marks may remain on the drafting surface. Although on the whole drafting surface writing with ink is excellent, the acceptance of ink may become irregular on these fingerprint marks. This can be remedied when a high voltage electric corona discharge is applied. For this purpose the drafting film is passed between an earthed roller and a corona electrode, the drafting surface facing the corona electrode. An A.C. high voltage is applied to the corona electrode to produce a high frequency corona discharge. A frequency range of from 10 to 100 kc. has proved to be very suitable for improving the drafting surface. Suitable current intensities were between $0.5 \times 10^{-5}$ and $1.5 \times 10^{-5}$ a./cm., i.e. the current per length of the corona discharge.

Instead of being directly used as drafting film, the drafting surface may be covered with a light-sensitive layer, e.g. a light-sensitive diazotype layer or a light-sensitive silver halide emulsion layer. In the case of a diazotype material the drafting lacquer composition itself may be sensitized by adding thereto a suitable light-sensitive diazo compound and a coupling agent.

According to a particular embodiment the drafting surface of the drafting film is coated with a water-permeable heat-sensitive recording layer comprising particles in substantially discrete, contiguous relationship, which particles consist essentially of a hydrophobic thermoplastic polymer. The water-permeable recording layer undergoes a substantial reduction in water-permeability at the areas exposed to heat.

According to a preferred embodiment said heat-sensitive recording layer contains said hydrophobic thermoplastic polymer particles dispersed in a hydrophilic binder in a weight ratio in excess of 1:1 and optionally a finely divided substance absorbing visible light and/or infrared radiation.

Such heat-sensitive recording layers are described e.g. in the published Dutch patent applications 6414226 and 6606719.

EXAMPLE 1

50 g. of very pure crystalline silicon dioxide with an average diameter of $5\mu$ and 5 g. of monobutyl phosphate were dispersed in 4 hours in 200 ml. 1,2-dichloroethane. Subsequently, 33.5 g. of a soluble partially cured melamine-formaldehyde resin, 16.5 g. of polyester urethane prepared by after-treatment of a polyester of adipic acid and 1,4-butanediol with p,p'-diphenylmethane diisocyanate, and 3.3 g. of p-toluene sulphonic acid in the form of a 50% by weight solution in methanol were added to the dispersion. The mixture was stirred for 2 hours. The resulting paste was filtered by means of a Cunofilter of $10\mu$ and diluted with 1,2-dichloroethane, to obtain a concentration of approximately 20 g. of solids per 100 ml. 1 ml. of a 1% by weight solution of low molecular weight methyl polysiloxane in methyl ethyl ketone was then added as levelling agent per 100 ml. of the lacquer composition.

From the above lacquer composition a layer was then coated on a biaxially oriented polyethylene terephthalate film support having a thickness of $100\mu$ in such a ratio, that upon drying 1.5 g. of dry substance was present per sq. m. The dried layer had a thickness of approximately $5\mu$ after heating at 120° C. for 4 minutes. In this way a very good drafting film for pencil as well as for ink was obtained.

EXAMPLE 2

To one side of a non-stretched polyethylene terephthalate film a subbing layer was applied from an aqueous suspension of a copolymer of vinyl chloride, vinylidene chloride, n-butyl acrylate, and itaconic acid (63:30:5:2 mole percent), whereupon the polyethylene terephthalate film was oriented.

The subbing layer was then coated with a lacquer composition, prepared as described in Example 1, so that upon drying at 110° C. for 8 minutes a layer having a thickness of 5μ was obtained. A very good drafting film was produced.

EXAMPLE 3

A dimensionally oriented polyethylene terephthalate support having a thickness of 100μ was coated with a first subbing layer from an 8% by weight solution of polyethylene isophthalate in 1,2-dichloroethane at a ratio of 1.3 g. of polyester per sq.m. of the support. After drying a second subbing layer was applied from the following composition at a ratio of 1 l. per 40 sq.m.:

gelatin—10 g.
water—50 ml.
maleic acid—1 g.
methanol—615 ml.
butanol—145 ml.
acetone—140 ml.
cellulose nitrate—4 g.
methylene diol—50 ml.

Subsequently, the dry subbing layer was coated with the lacquer composition described in Example 1 at such a ratio that a layer having a thickness of 5μ was formed, whereupon the whole was heated at 110° C. for 8 minutes. A very good drafting film was produced.

EXAMPLE 4

35 g. of very pure crystalline silicon dioxide having an average particle size of 5μ and 3.5 g. of monobutyl phosphate were dispersed for 4 hours in 140 ml. of 1,2-dichloroethane.

The following components were then added consecutively to the resulting dispersion:

| | G. |
|---|---|
| Soluble partially cured melamine-formaldehyde resin | 43.5 |
| A polyesteramide of adipic acid, ethylene glycol, and ethanolamine, which had been modified with p-toluene diisocyanate | 215 |
| Titanium dioxide with an average particle size of 0.1μ (matting agent), which had been dispersed previously with monobutyl phosphate in methyl ethyl ketone | 3.5 |
| A 50% by weight solution of p-toluene sulphonic acid in methanol | 4.35 |

The resulting mixture was stirred for 3 hours and filtered through a Cunofilter of 10μ. The mixture was then diluted with 1,2-dichloroethane to a concentration of approximately 20 g. of solids in 100 ml. 1 ml. of methyl polysiloxane was added as levelling agent per 100 ml. of lacquer composition.

This lacquer composition was applied to a subbed polyethylene terephthalate film support as described in Example 2, in such a way that upon drying at 100° C. for 8 minutes the resulting layer had a thickness of approximately 5μ.

A very good drafting film was obtained.

EXAMPLE 5

The process of Example 4 was repeated with the proviso, however, that instead of titanium dioxide a same amount of finely divided zinc oxide was added as matting agent. An excellent drafting film was obtained.

EXAMPLE 6

The mat surface of the drafting film manufactured according to the process described in Example 1 was exposed to 4 successive corona discharges from a high frequency power supply. This power supply produced a pulsating voltage, the waveform comprising a narrow pulse of a magnitude of 500 kv., followed by a flat portion of 5 kv. The repeat frequency amounted to about 35 kc. The current intensity for each electrode was $1.5 \times 10^{-5}$ a./cm. and the film speed was 10 m./min.

The surface of the drafting film was improved considerably especially with respect to fingerprint marks.

EXAMPLE 7

To the mat layer of the drafting film manufactured according to the process of Example 1 a subbing layer of the following composition was applied at a ratio of 15 g./sq.m.:

| | G. |
|---|---|
| 40% aqueous dispersion of polyethylene having a particle size of less than 0.1μ and an average molecular weight comprised between 15,000 and 30,000 | 38 |
| Water | 730 |
| 20% aqueous dispersion of copolymer of vinylidene chloride, N-butylmaleimide, and itaconic acid (88:10:2 mole percent) | 38 |
| 30% aqueous dispersion of silica with an average grain size of 0.025μ | 90 |
| Ethanol | 100 |

The dried support was then coated at 45° C. with the following heat-sensitive composition in a ratio of 20 g. per sq.m.:

| | G. |
|---|---|
| 20% aqueous solution of poly-N-vinyl pyrrolidone | 90 |
| Water | 400 |
| 40% aqueous dispersion of polyethylene (see above) | 114 |
| Aqueous dispersion containing per 100 g., 16 g. of carbon with a particle size of 0.1μ and 2 g. of poly-N-vinyl pyrrolidone | 200 |
| Luconyl grün GN (a green pigment sold by Badische Anilin- & Soda-Fabrik A.G., Germany) | 50 |
| Permanentcarmin FBB Colanyl Teig (C.I. Pigment Red 146, a pigment sold by Farbwerke Hoechst A.G., Germany) | 63 |
| Permanentgelb HR, Colanyl Teig (C.I. Pigment Yellow 83, a pigment sold by Farbwerke Hoechst A.G., Germany) | 50 |

The heat-sensitive layer was dried at 45° C. and flash-exposed with a rod-like xenon flash lamp with an energy of 0.3 watt.sec. per sq.cm., while in contact with a black-and-white separation line negative. Subsequently, the unexposed portions of the recording layer were washed away with water so that a positive image was obtained. This black-and-white image could easily be retouched and all annotations could easily be made.

We claim:

1. Process for the manufacture of a dimensionally stable drafting film including a flexible polyester substrate and a mat layer comprising the steps of (1) providing a flexible polyester film substrate; (2) providing an admixture or dispersion of a binder combination including a soluble, partially cured formaldehyde resin, a diisocyanate modified polyester or polyesteramide, finely divided pigment particles, a hydrophilic component, and an acid cross-linking catalyst for said formaldehyde resin and said diisocyanate modified polyester or polyesteramide; (3) controllably applying said admixture or dispersion of (2) to support (1) to form a uniform mat layer on said support having a thickness substantially equal to the average diameter of said pigment particles, thereby providing substantially a mono-layer of pigment particles in said mat layer; and (4) heating the resultant coated substrate at an elevated temperature for a time sufficient to cure said mat layer, said pigment particles being employed in said layer in an amount sufficient so that said pigment particles constitute from about 30 to 50 percent by weight of the total weight of the dried mat layer.

2. Process according to claim 1, wherein pigment particles having a diameter less than 10µ are used.

3. Process according to claim 1, wherein pigment particles of crystalline silicon dioxide having an average diameter of 5µ are used.

4. Process according to claim 1, wherein the formaldehyde resin is a soluble partially cured melamineformaldehyde resin.

5. Process according to claim 1, wherein the polyester modified with diisocyanate is a polyester of adipic acid and 1,4-butanediol, which had been modified with p,p'-diphenylmethane-diisocyanate.

6. Process according to claim 1, wherein the polyesteramide modified with diisocyanate is a polyesteramide of adipic acid, ethylene glycol, and ethanolamine, which had been modified with p-toluene diisocyanate.

7. Process according to claim 1, wherein the ratio of partially cured formaldehyde resin to diisocyanate-modified polyester or polyesteramide is comprised between 80:20 and 40:60.

8. Process according to claim 1, wherein the hydrophilic component is monobutyl phosphate.

9. Process according to claim 1, wherein the acid cross-linking catalyst is p-toluene sulphonic acid.

10. Process according to claim 1, wherein cross-linking is obtained by heating at a temperature between 80 and 120° C.

11. Process according to claim 1, wherein after heat treatment the drafting surface is exposed to a high voltage electric corona discharge.

12. Process according to claim 1, wherein there is applied to the drafting surface a heat-sensitive recording layer, which has the property of undergoing a change in water-permeability and removability under the action of heat.

13. A dimensionally stable drafting film which has good pencil and ink receptivity and is easily erasable without leaving erasure marks comprising (1) a dimensionally stable polyester film substrate and (2) a mat layer containing pigment particles uniformly coated over said support, said mat layer consisting essentially of the moiety of a binder combination including a soluble, partially cured formaldehyde resin; a diisocyanate modified polyester or polyesteramide, finely divided hard pigment particles, and a hydrophilic component; said moiety being formed by heating an admixture of said binder combination in the presence of an acid cross-linking catalyst for said formaldehyde resin and said diisocyanate modified polyester or polyesteramide at an elevated temperature for a time sufficient to polymerize said combination, said mat layer having a thickness substantially equal to the average diameter of said pigment particles with the said particles being present in said layer in an amount sufficient to constitute from about 30 to 50 percent by weight of the total weight of the dried mat layer.

14. The drafting film according to claim 13, wherein pigment particles having a diameter less than 10µ are used.

15. The drafting film according to claim 13, wherein pigment particles of crystalline silicon dioxide having an average diameter of 5µ are used.

16. The drafting film according to claim 13, wherein the formaldehyde resin is a soluble partially cured melamine-formaldehyde resin.

17. The drafting film according to claim 13, wherein the polyester modified with diisocyanate is a polyester of adipic acid and 1,4-butanediol, which had been modified with p,p'-diphenylmethane-diisocyanate.

18. The drafting film according to claim 13, wherein the polyesteramide modified with diisocyanate is a polyesteramide of adipic acid, ethylene glycol, and ethanolamine, which had been modified with p-toluene diisocyanate.

19. The drafting film according to claim 13, wherein the ratio of partially cured formaldehyde resin to diisocyanate-modified polyester or polyesteramide is comprised between 80:20 and 40:60.

20. The drafting film according to claim 13, wherein the hydrophilic component is monobutyl phosphate.

21. The drafting film according to claim 13, wherein the acid cross-linking catalyst is p-toluene sulphonic acid.

References Cited

UNITED STATES PATENTS

| | | | |
|---|---|---|---|
| 3,154,427 | 10/1964 | Forrest et al. | 117—161 |
| 3,115,420 | 12/1963 | Centa et al. | 117—138.8 F |
| 2,964,423 | 12/1960 | Van Stappen | 117—138.8 F |
| 2,999,016 | 9/1961 | Beeber et al. | 117—138.8 F |
| 3,447,947 | 6/1969 | Abbot et al. | 117—138.8 F |
| 3,030,223 | 4/1962 | Alstad et al. | 117—138.8 F |
| 3,366,505 | 1/1968 | Bisschops et al. | 117—62 |
| 3,437,510 | 4/1969 | Diaz | 117—62 |
| 3,027,343 | 3/1962 | Kane | 117—138.8 F |
| 3,132,246 | 5/1964 | Mosher et al. | 117—62 |

FOREIGN PATENTS

| | | | |
|---|---|---|---|
| 580,524 | 1946 | Great Britain | 117—138.8 |

WILLIAM D. MARTIN, Primary Examiner

M. SOFOCLEOUS, Assistant Examiner

U.S. Cl. X.R.

117—36.8, 47 A, 76, 138.8 F, 161 LN, UC, UN, UT; 96—75, 87; 250—65.1

UNITED STATES PATENT OFFICE
CERTIFICATE OF CORRECTION

Patent No. 3,627,563            Dated   December 14, 1971

Inventor(s)   Romain Henri Bollen et al

It is certified that error appears in the above-identified patent and that said Letters Patent are hereby corrected as shown below:

Column 1, line 7, the priority date should read -- Feb. 11, 1969 --. Column 3, line 6, "Indeed;" should read -- Indeed, --. Column 5, line 4, "stepness" should read -- steepness --. Column 6, line 64, "1.5 g." should read -- 7.5 g. --. Column 8, lines 38, 41, and 44, "Germany" should read -- W-Germany --.

Signed and sealed this 13th day of November 1973.

(SEAL)
Attest:

EDWARD M. FLETCHER, JR.              RENE D. TEGTMEYER
Attesting Officer                    Acting Commissioner of Patents